APPARATUS FOR REGISTERING PRINTING PLATES

Filed Jan. 17, 1951

8 Sheets-Sheet 1

INVENTOR.
HARRY W. FAEBER
BY
Campbell, Brumbaugh, Free & Graves
his ATTORNEYS

March 6, 1956 H. W. FAEBER 2,736,968

APPARATUS FOR REGISTERING PRINTING PLATES

Filed Jan. 17, 1951 8 Sheets-Sheet 2

INVENTOR.
HARRY W. FAEBER
BY
Campbell, Brumbaugh, Free & Graves
his ATTORNEYS

March 6, 1956 H. W. FAEBER 2,736,968

APPARATUS FOR REGISTERING PRINTING PLATES

Filed Jan. 17, 1951 8 Sheets-Sheet 3

INVENTOR.
HARRY W. FAEBER
BY
Campbell, Brumbaugh, Free & Graves
his ATTORNEYS

March 6, 1956 H. W. FAEBER 2,736,968

APPARATUS FOR REGISTERING PRINTING PLATES

Filed Jan. 17, 1951 8 Sheets-Sheet 4

INVENTOR.
HARRY W. FAEBER
BY
Campbell, Brumbaugh, Free & Graves
his ATTORNEYS

APPARATUS FOR REGISTERING PRINTING PLATES

Filed Jan. 17, 1951

8 Sheets-Sheet 5

INVENTOR.
HARRY W. FAEBER
BY
Campbell, Brumbaugh, Free & Graves
his ATTORNEYS

INVENTOR.
HARRY W. FAEBER
BY
Campbell, Brumbaugh, Free & Graves
HIS ATTORNEYS

March 6, 1956 H. W. FAEBER 2,736,968

APPARATUS FOR REGISTERING PRINTING PLATES

Filed Jan. 17, 1951 8 Sheets-Sheet 7

INVENTOR.
HARRY W. FAEBER
BY
Campbell, Brumbaugh, Free & Graves
his ATTORNEYS

March 6, 1956 H. W. FAEBER 2,736,968

APPARATUS FOR REGISTERING PRINTING PLATES

Filed Jan. 17, 1951 8 Sheets-Sheet 8

INVENTOR.
HARRY W. FAEBER
BY
Campbell, Brumbaugh, Free & Graves
his ATTORNEYS

United States Patent Office 2,736,968

Patented Mar. 6, 1956

2,736,968

APPARATUS FOR REGISTERING PRINTING PLATES

Harry W. Faeber, Larchmont, N. Y., assignor to Time, Incorporated, New York, N. Y., a corporation of New York Application January 17, 1951, Serial No. 206,452

9 Claims. (Cl. 33—184.5)

The present invention relates to apparatus and methods by means of which printing plates may be formed so that they will accurately register in position with related printing surfaces during the printing operation in which the plates are mounted upon a printing press and the run of the press carried on in accordance with standard printing practice.

In the operation of printing presses there has always existed the problem of registering the plates accurately on the printing cylinders so that the printed impression of each plate will register satisfactorily with the printed impression of related printed plates. For example, in multicolored printing operation, each subject will be reproduced by four printed impressions, each impression being made by a separate printing plate (referring to operations wherein the subject matter is reproduced in three colors and black). Each of these plates, accordingly must be mounted upon its respective printing cylinder in such position that the impressions formed by all of them will be in precise register.

In order that printing plates may be formed so that they will register precisely in their positions upon their respective printing cylinders, the present invention has been made and embodies not only a method by means of which printing plates may be preregistered accurately and conveniently but also apparatus by means of which the plates may be formed or finished so that they will, when mounted upon their respective printing cylinders, register exactly in position and area with the areas on which the impressions are made upon the web of paper passing through the printing press.

The foregoing and other objectives, together with the method and apparatus by means of which they are realized, will be understood more fully from the accompanying drawings, wherein—

Figure 1 is a perspective view of a registering and marking mechanism constructed in accordance with the present invention;

Figure 1*a* is a perspective of an electrotype which is typical of those that may be register-punched in accordance with this invention;

Figure 5:
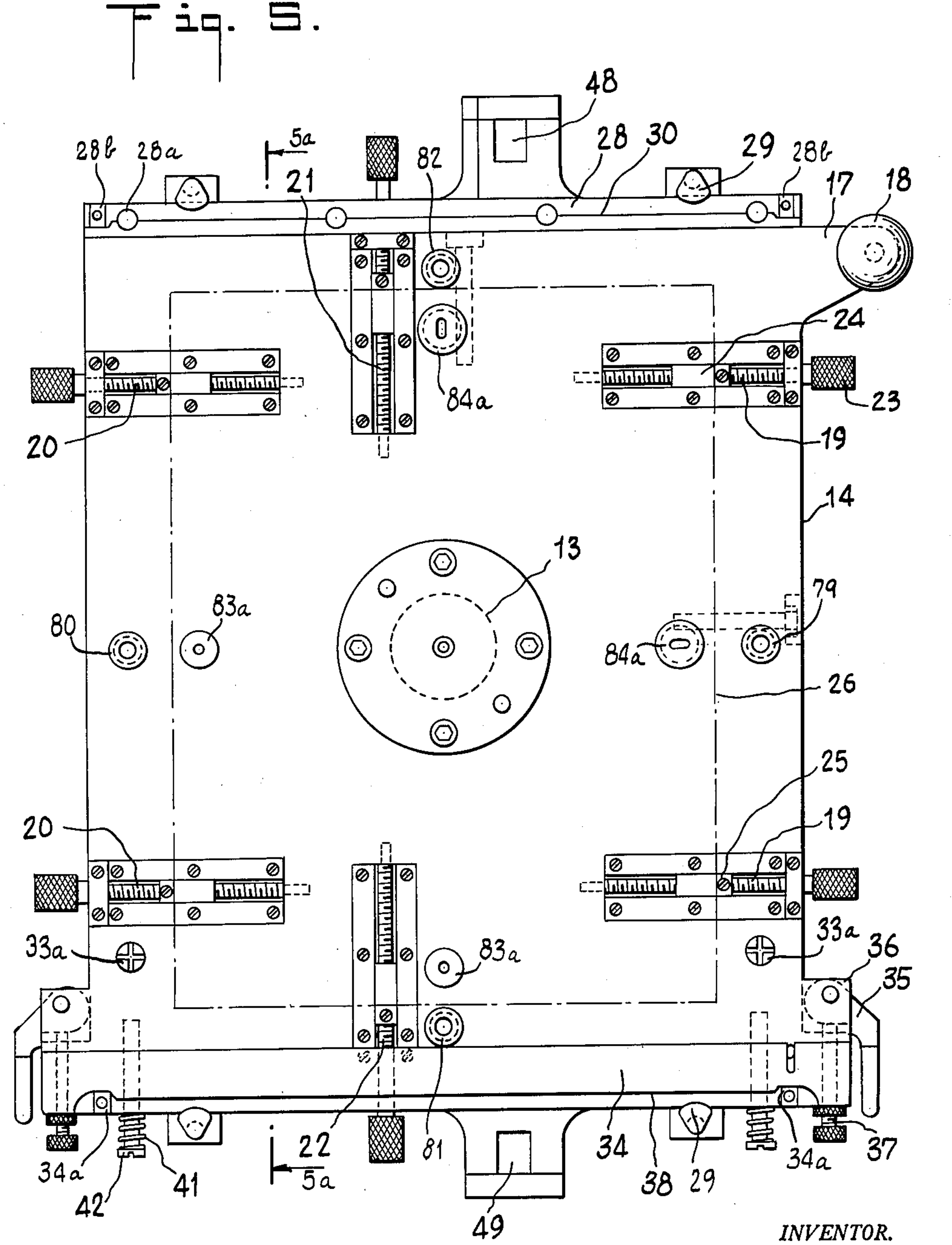
Figure 5 is a plan view of the turntable mechanism illustrated in smaller scale in Figure 1.
Figure 5A:
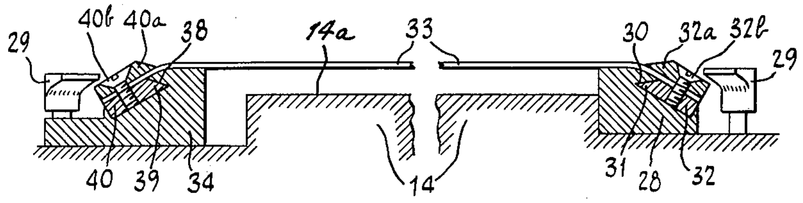
Figure 10B:
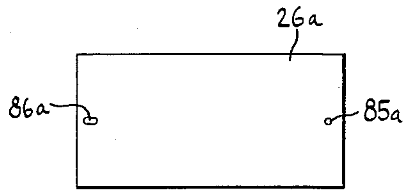
Figure 10A:
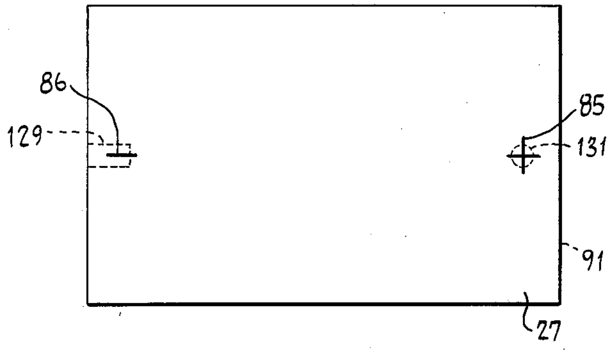
Figure 6:
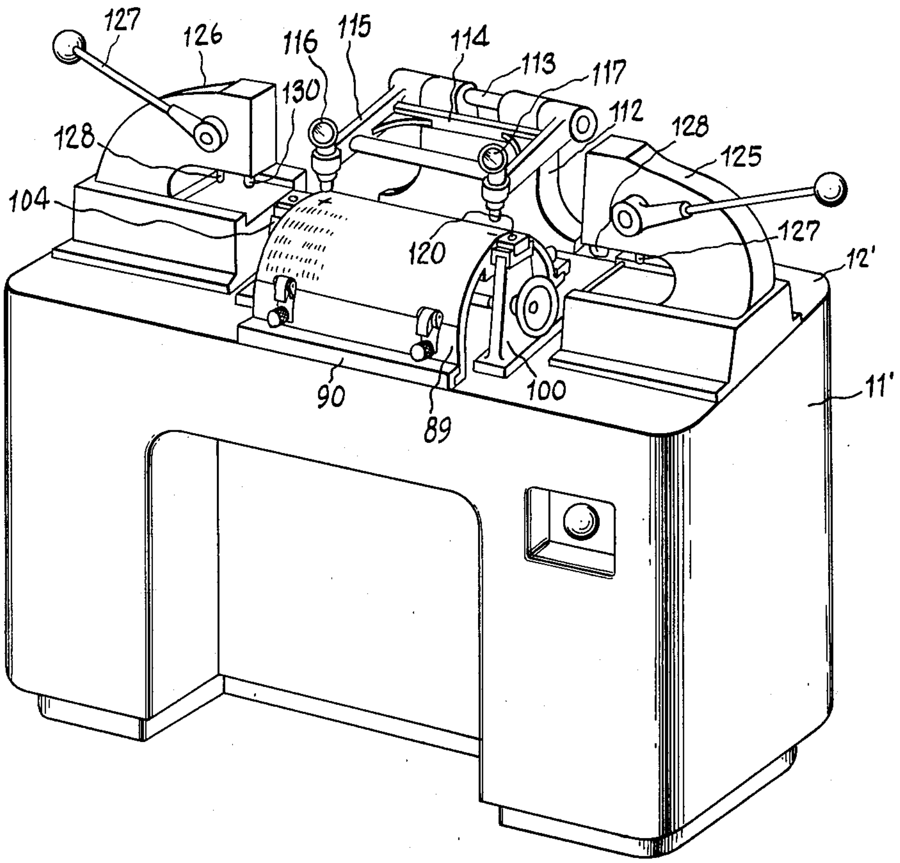
Figure 7:
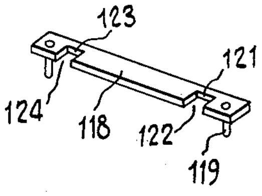
Figure 8:
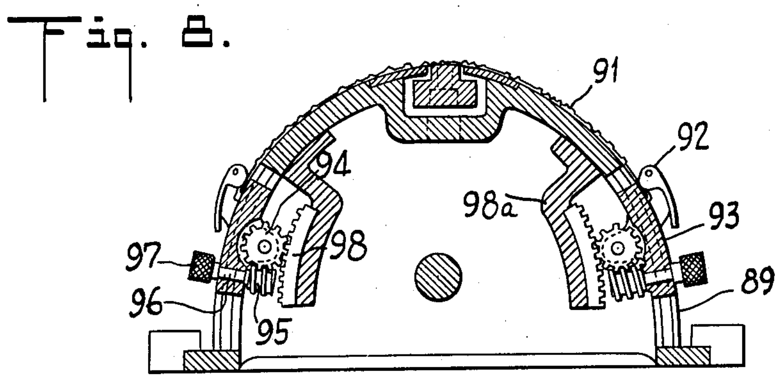
Figures 9, 10:
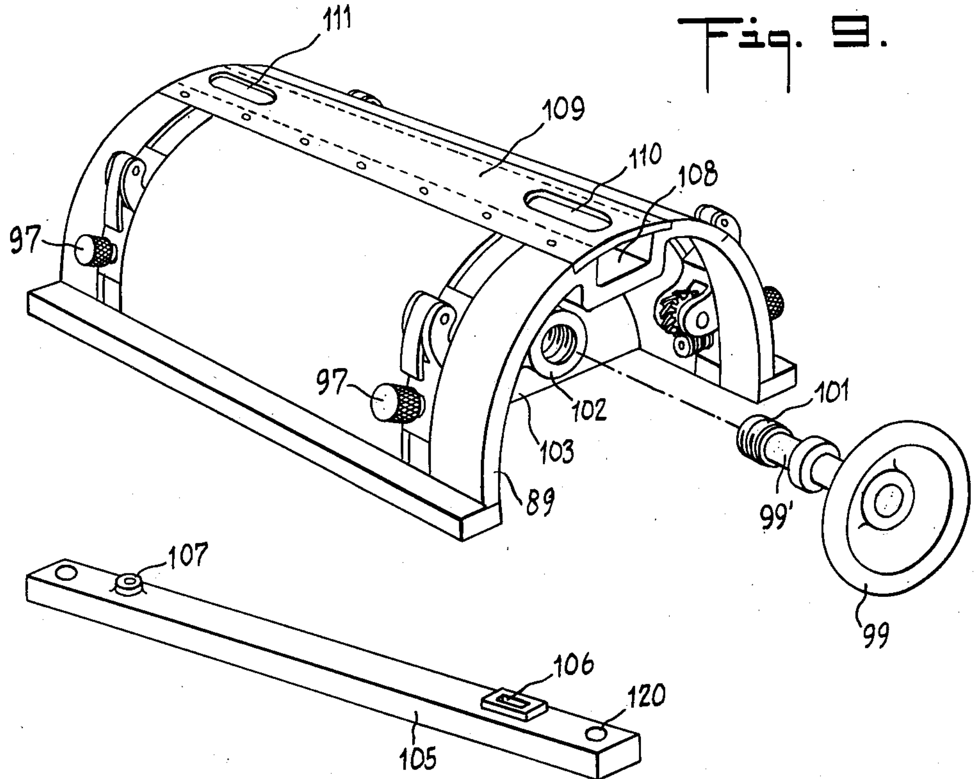

Figure 5*a* is a view in section, taken on line 5*a*–5*a* of Figure 5;

Figure 6 is a perspective view showing a mechanism by means of which curved printing plates may be registered and punched in accordance with this invention;

Figure 7 is a perspective view of an alignment bar for use in the machine shown in Figure 6;

Figure 8 is a view in cross-section, taken in a vertical plane transverse to the axis of the curved saddle mechanism shown in Figure 6, and passing through the plate clamping and adjusting elements;

Figure 9 is an enlarged view in perspective and exploded to show the detailed features of the saddle mechanism of the device shown in Figure 6;

Figure 10 is a perspective view of the die bar for use in connection with the saddle illustrated in Figure 9;

Figure 10*a* is a plan view of a plate marked in accordance with this invention and showing in dotted lines the manner in which it is punched; and Figure 10*b* is a plan view of an electro- or stereotype plate showing the register holes punched therein.

Figures 1, 1A:
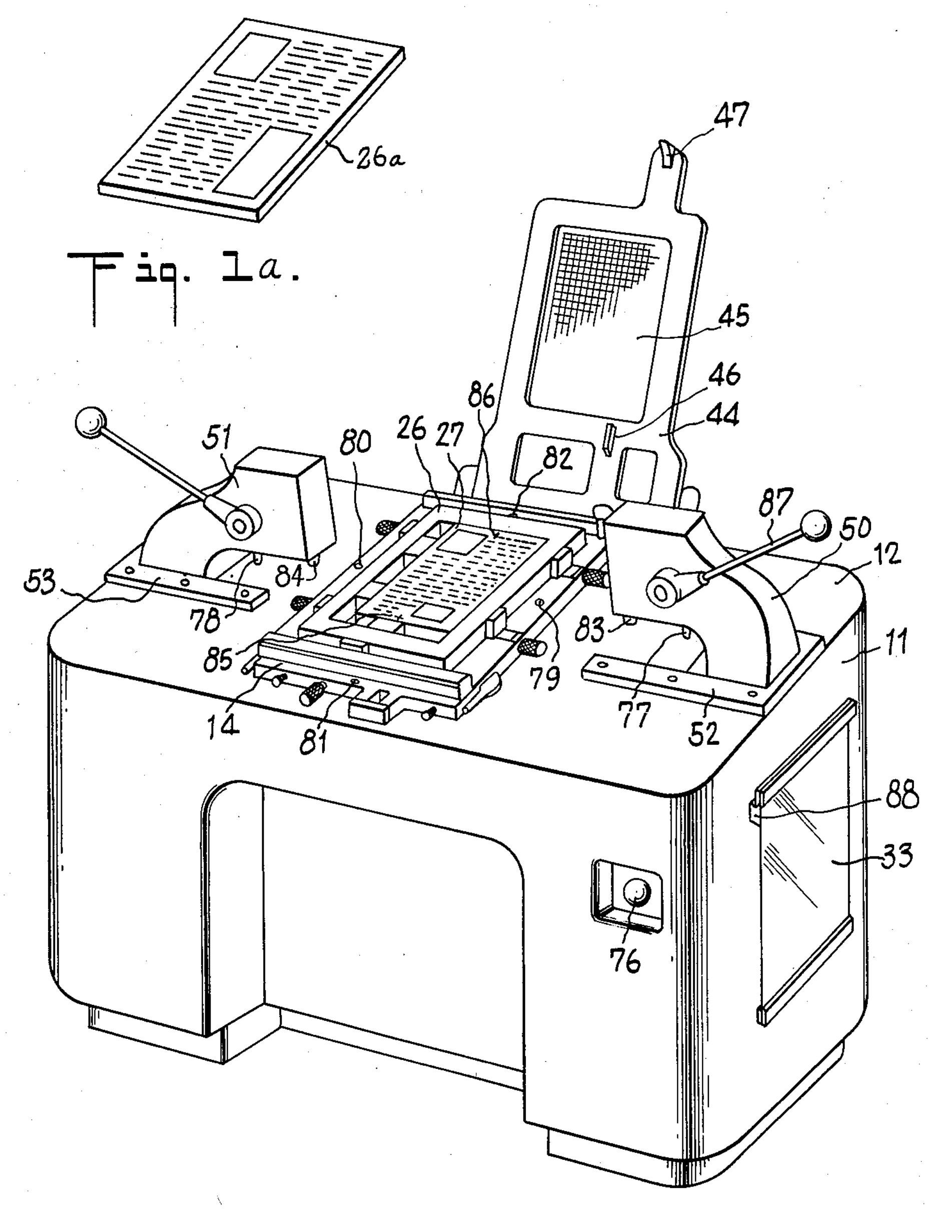
Figure 2:
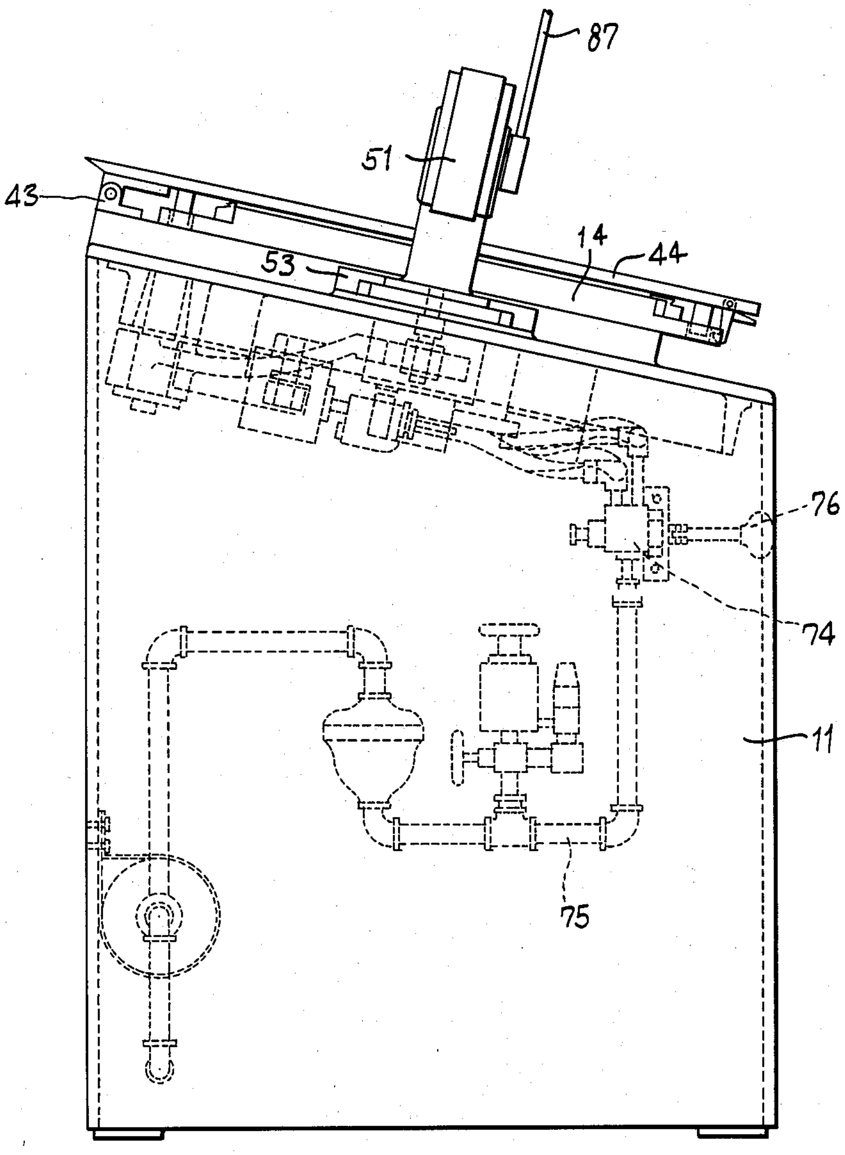
Figure 2 is a view in end elevation showing the machine of Figure 1.
Figure 3:
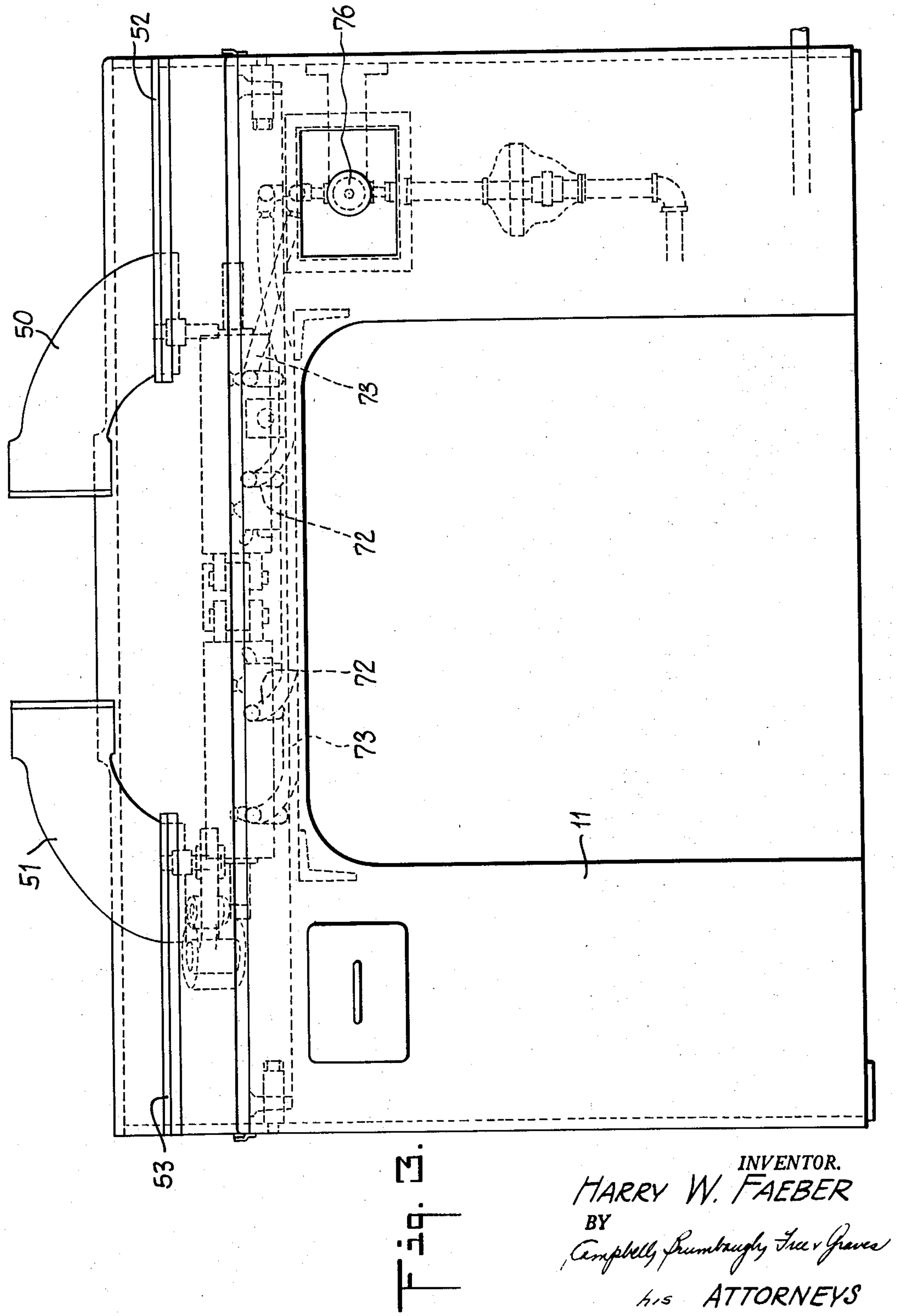
Figure 3 is a view in front elevation showing the device of Figure 1.
Figure 4:
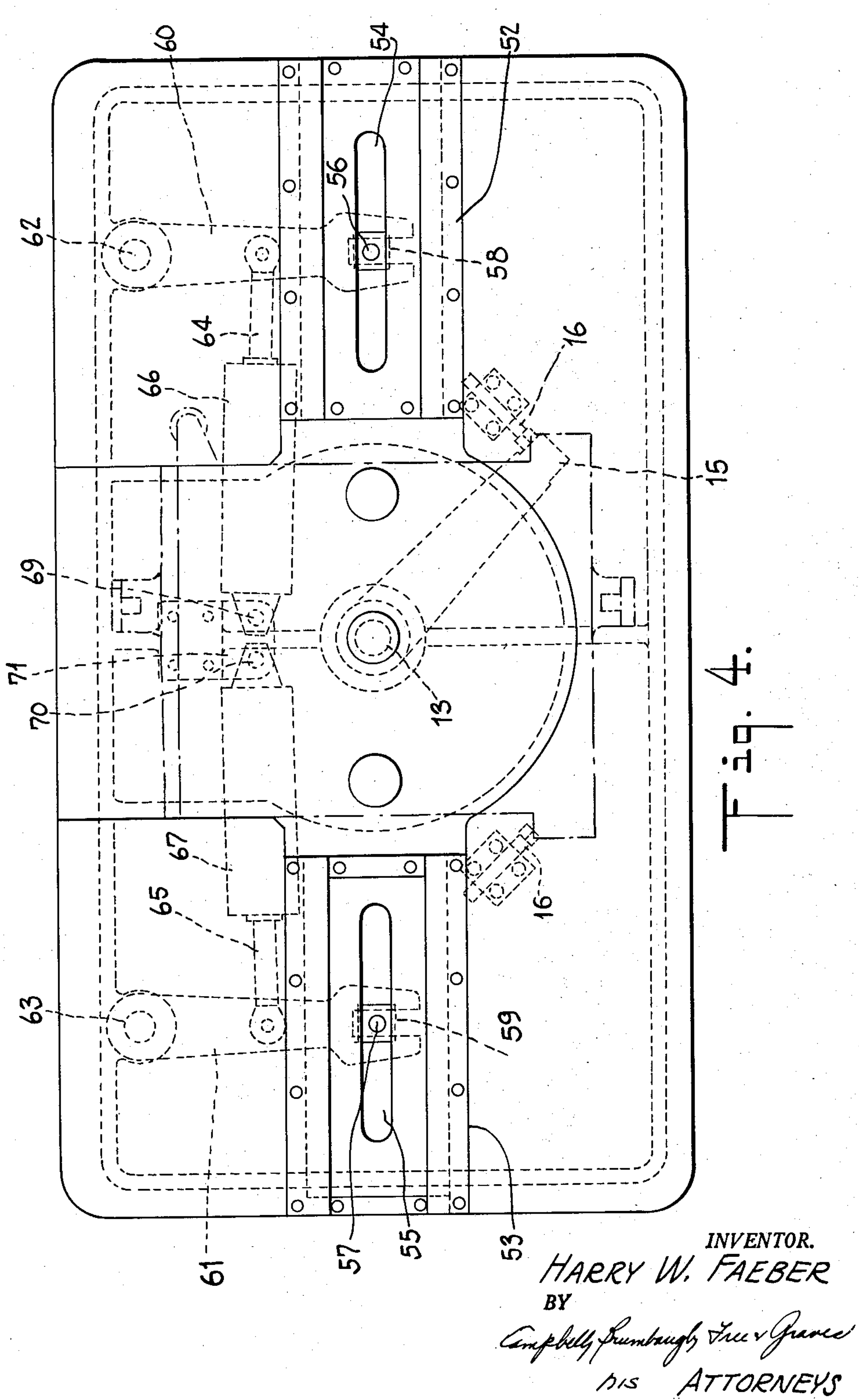
Figure 4 is a plan view of the device shown in Figure 1, with the marking device removed therefrom and with the operating mechanism illustrated in dotted lines.

Referring to the mechanism illustrated in Figures 1 to 5, inclusive, the marking machine constructed in accordance with this invention comprises a body 11 formed with a table top 12 which may, if desired, be formed to slope downwardly from rear to front as illustrated in Figure 2. The table 12 is provided with a central shaft 13 (Figure 4) upon which a turntable 14 is mounted so that the latter may swing about the axis of the shaft 13. The shaft is formed with an arm 15 that lies normally within the body 11 of the mechanism and is adapted to engage spaced stops 16 that are adjustably mounted within the body of the machine. In the form of the invention illustrated herein, the spaced stops are so adjusted that they limit the movement of the arm 15 to an arc of 90°.

As illustrated in Figure 5, the turntable 14 is formed with an extension 17 upon which a handle 18 is mounted to facilitate manual swinging of the turntable through the 90° arc above mentioned. The turntable is provided with a plurality of rotatable but axially fixed screws 19 and 20 upon the respective opposite sides thereof and with similar screws 21 and 22 at the ends thereof.

Each of the screws is provided with a knurled head 23 to facilitate the manual adjustment thereof and also with slides 24 threaded on the respective screws and formed with clamp members 25 which are adapted to engage the sides and ends of a chase 26 within which a plate 27, consisting of lines of type, cuts, etc., has been locked in accordance with standard practice. The particular form of chase forms no part of the present invention and, therefore, need not be described in detail herein. It is sufficient to observe that the position of the chase within which the printing plate is secured may be varied as desired by manipulating the screw threaded shafts 19, 20, 21, and 22 carried by the turntable 14. Instead of chase 26, an electrotype plate or copper original **26*a* may be placed on the turntable 14** and similarly manipulated. Wherever the chase and the printing plate locked up therein is mentioned below, it is to be understood that a copper original, an electrotype, or a stereotype may be used in its stead.

At one end of the turntable 14, a stationary clamp bar 28 is secured by means of screws **28*a*. This clamp bar is formed with a re-entrantly formed locking flange 30 over which a cooperating lock flange 31 engages, the last named flange 31 being formed upon a plate 32 which is clamped to one end of a transparent sheet 33 by means of plate 32*a* and screws 32*b*, the function of which will be described in greater detail presently. Clamps 29 prevent the plates 32 and 32*a* from tipping up. At the end of the turntable 14, opposite from the bar 28, a movable lock plate or clamp bar 34 is mounted, eccentric cam levers 35 pivoted upon extensions 36 of the turntable 14 being adapted to engage pins 37 threaded in the clamp bar 34 in order that the clamp bar may be moved away from the axis of the turntable to cause the clamping flange 38 thereof to engage a cooperating flange member 39 of a plate 40 that is secured to the end of the transparent sheet 33 by means of plate 40*a* and screws 40*b* remote from the plate 32. End stops 28*b* and 34*a*** locate plates 32 and 40, respectively, sidewise. Springs 41 carried upon screws 42 normally urge clamp bar 34 inwardly and cause the pins 37 to follow the cam surface of the levers 35. Threaded pins 37 may be adjusted to regulate the tension of the vinylite sheet 33, thus stretching it to any desired degree. As will be seen later, markers 33*a* serve to indicate when the vinylite is stretched to the correct degree. This mechanism thus serves as a means for securing the transparent sheet over the chase and the printing plate secured therein to permit the operation presently to be described to be carried out.

At the back of the table 12 hinge brackets 43 are provided upon which a frame 44 is hinged, as illustrated in Figure 2. The frame 44 carries a transparent glass plate 45 within which has been formed ruled cross lines to facilitate the registering of the printing plate 27 carried by the chase 26.

Positioning lugs 46 and 47 are formed on the frame 44 and are adapted to be received within mating recesses 48 and 49, respectively, formed on the turntable 14. In this fashion the frame 44 may be swung down in the position illustrated in Figure 2 and properly locked with respect to the turntable 14. Manipulation of the knurled knobs 23 thus permits the plate 27 to be squared properly with respect to the register screen 45. In order that the plate 27 may be suitably marked after it has been properly located upon the turntable 14, oppositely spaced marking mechanisms are provided upon the table 12. These mechanisms comprise standards 50 and 51 that are slidable in respective guideways 52 and 53 carried by the table 12. Slots 54 and 55 within the respective guideways 52 and 53 receive downwardly extending pins 56 and 57, the ends of which carry bearing blocks 58 and 59, respectively, that are received within the bifurcated ends of actuating levers 60 and 61, respectively. The levers are journaled within the machine on pins 62 and 63 and are actuated by piston rods 64 and 65 that carry pistons received within the respective actuating cylinders 66 and 67. The cylinders are pivoted at 69 and 70 to a bracket 71 carried on the underside of the table 12, and a suitable fluid under pressure is supplied selectively to opposite ends of the cylinders through conduits 72 or conduits 73, respectively. Fluid under pressure is directed to these conduits through a control valve 74 from a fluid pressure line 75 of conventional design. A manually operated control knob 76 is provided at the front of the machine to facilitate the positioning of the pedestals 50 and 51.

The pedestals carry locating pins 77 and 78, respectively, which pins are received within apertures 79 and 80, respectively, or apertures 81 and 82, respectively, depending upon whether the turntable is permitted to remain in the position illustrated in Figure 1, or is rotated through 90°. In any event, the locating pins 77 and 78 are carried upon movable heads within the pedestals 50 and 51 which movable heads also carry marking punches 83 and 84, respectively. The marking punch 83 is formed to make a cross hair line 85, while the marking punch 84 is formed to make a single straight line indentation 86 in the surface of the plate 27. Manually operable levers 87 are provided to enable the marking punches to be lowered to form the marks above described. When registering electrotypes or stereotypes, a round hole punch is used instead of marking punch 83, and an elongated hole punch in place of 84. Dies 83*a* and 84*a*, set in turntable 14, cooperate with the punches in putting the round and elongated holes (85*a* and 86*a*, respectively, in Figure 10*b*) in the electro- or stereotype 26*a*.

The operation of the foregoing mechanism is as follows. If, for example, a multicolor printing operation is involved in which a key and a plurality of color plates are to be formed so that they will be effectively registered when placed upon the printing cylinders of a printing press, the key plate is positioned and locked within the chase 26. The chase is then placed upon the turntable 14 and the frame 44 lowered into the position illustrated in Figure 2. The knurled knobs 23 are then manipulated to cause the image on the plate 27 to be properly aligned with the cross-lines on the glass screen 45. The screen is then swung into the position illustrated in Figure 1, and the turntable 14 moved through 90° by means of the hand knob 18. If the register marks are to be applied to the sides of the plate, the turntable is, of course, left in the position illustrated in Figure 1. The punch standards 50 and 51 are then moved into the operating position by manipulating the manual control knob 76 and the punch levers 87 are actuated to cause the marking punches 83 and 84 to make their respective marks upon the plate 27. In this operation, the guide or locating pins 77 and 78 enter the appropriate locating apertures 79, 80 or 81, 82 to insure proper relationship of the marking punches with respect to the turntable 14.

The punch mechanisms 50 and 51 are then retracted by actuating the control knob 76 in the opposite direction and the plate 27 is then inked manually. Markers 33*a*, whose top surfaces are on a level with plates 27, are inked at the same time. The transparent plastic sheet 33 is then clamped over the chase 26 and upon the clamp bars 28 and 34 in the manner previously described, and a manual impression upon the transparent sheet is made by depressing the sheet onto the printing plate 27 and markers 33*a*. After the printed impression is made upon the transparent sheet, the latter with its clamp plates is removed and, if desired, it may be temporarily supported upon a bracket 88 upon the side of the machine. The key plate, together with its chase is then removed from the turntable, the key page having thus been register-marked. It is to be observed that if the key plate is a copper original, it may be placed upon a filler block formed of suitable metal, such as aluminum, and this filler block would then take the place of a chase 26 in the operation above described. An electrotype or stereotype key plate would be placed on the turntable without an underlay, thus allowing the punching through of register holes. For this type of work the surface 14*a* of turntable 14 is made higher, so that the height of the space between surface 14*a* and the register sheet 33 equals the thickness of the electrotype or stereotype plate.

The color plates of the same page are then successively register-marked by placing them upon filler blocks (corresponding to chase 26), placing the blocks upon the turntable 14, placing the transparent printed sheet 33 over the turntable, and securing it to the clamps 28 and 34 in the manner above described. If, due to atmospheric changes since the time the key plate was registered, the transparent sheet has stretched or shrunk, or if threaded pins 37 were moved in the meantime, the impression of markers 33*a* on the transparent sheet is brought into register with the markers 33*a* by manipulating threaded pins 37, thus assuring that the sheet is in the same position as when the impression was made on it from the key plate. The knurled knobs 23 are then manipulated to cause the image of the color plates to register properly with the printed image on the transparent sheet 33. After this registration is accomplished, the transparent sheet is removed and the marking punches are manipulated to make the appropriate marks 85 and 86 in the plates in the manner above described. Again, electrotypes or stereotypes are handled similarly, except that they are placed on the turntable without underlay to allow punching through.

This operation, as above mentioned, is performed upon all of the color plates for the same image and, as a result, all of the plates are accurately register-marked so that, in the final operations, the printing plates may be effectively registered precisely as desired upon the various printing cylinders.

In the case of plates which have been marked but not punched through, after suitable operations are performed to completely form the plates in curved form, the latter are then register-punched by the mechanism shown in Figures 6 to 10.

In the mechanism there shown, the table 12' of a body or frame 11' is provided with mechanism by means of which the curved printing plates may be register-punched. To accomplish this, a curved saddle 89 is carried upon the table 12' by means of tracks 90 and is thus adapted to receive the curved printing plates 91. To enable the plates 91 to be secured in position, the saddle is provided with adjustable clamps 92 that engage the ends of the printing plates 91. The clamps 92 are mounted upon slides 93 upon which spiral pinions 94 are journaled. The pinions 94 are turned by worm threads 95 carried upon worm shafts 96 and operated by knurled knobs 97. The pinions 94 engage racks 98 secured to saddle 89 by means of brackets 98*a* and thus, upon turning the shafts 96, the position of the slides 93 upon the saddle 89 may be adjusted circumferentially of the saddle. The position of the saddle 89 may be adjusted longitudinally by means of a hand wheel 99 formed on a shaft 99', held endwise and journaled in a stationary pedestal 100 carried by the table 12', the shaft 99' being provided with a threaded extremity 101 that is threaded into a boss 102 carried by a transverse web 103 formed within the saddle 89.

Spaced upon the opposite side of the saddle 89 from the pedestal 100, a second pedestal 104 is provided, a die bar 105 being mounted fixedly upon the pedestals and being formed, at one end, with an elongated slotted die 106 and at the other end, with a round apertured die 107. The die bar 105 is slidably received within an elongated groove 108 in the saddle, a curved plate 109 being provided to overlie the die bar 105. The plate 109 is slotted at 110 and 111 to receive the dies 106 and 107, respectively.

At the rear of the table 12' a bracket 112 is secured, this bracket being provided with a hinge shaft 113 upon which a frame 114 is hinged. The frame is formed with arms 115 upon the ends of which microscopes 116 and 117 are mounted. The optical systems of these microscopes form no part of the present invention. The microscope 116 is formed with a cross hair line whereas the microscope 117 is formed with a single lengthwise hair line. When the frame 114 is lowered, the microscopes focus upon the surface of the curved plate 91 lying immediately beneath them. They thus pick up the register marks that were formed in the operations hereinabove described, which marks were carried over into the electrotype 91 through the molding and plating operations that are conventional in the formation of electrotypes and need not be described in detail herein.

In order quickly to locate the register marks formed upon the plate 91 within the limited field of the microscopes 116, an alignment bar 118 is placed over the electrotype 91 and upon the die bar 105, the alignment bar being provided with pins 119 that are received in locating apertures 120, formed in the ends of the die bar 105. With the alignment bar 118 in position, the rear edge 121 of recess 122 is lined up with the lengthwise register line formed upon the printing plate 91, thus locating the plate properly circumferentially of the saddle. A line 123 formed upon the rear edge of a recess 124 in the alignment bar 118 serves as a guide for properly positioning the printing plate 91 longitudinally of the saddle. To this end, this line 123 is registered with the crosswise register line at the end of the plate 91 spaced from the single register line. In this operation, the plate 91 is brought into approximate register and when the frame 114 is lowered, the microscopes 116 and 117 will then be found to have the respective register marks within their fields of vision. The electrotype shell 91 is clamped in this position by means of clamps 92, and the final accurate registration of the printing plate 91 is then accomplished by manipulating knobs 97 and hand wheel 99 until the respective register marks are brought into alignment with the hair lines in the microscopes.

Punch mechanisms 125 and 126 are slidably mounted upon the table 12' and may be actuated by a mechanism similar to that described in connection with the marking punches illustrated in Figure 1. The punch mechanisms are provided, respectively, with guide pins 127 and 128 that are received within the apertures 120 thus insuring that the plate will be punched accurately in the position to which it has been adjusted. When the frame 114 is swung upwardly and out of its operating position, the punches 125 and 126 are moved inwardly until they overlie the opposite portions of the printing plate. Operating handles 127 are then actuated, and an elongated punch 128 carried by the punch member 125 punches an elongated register slot 129 within the printing plate 91. The punch member 126 is provided with a round punch 130 which, when depressed, punches a round hole 131 in register with the cross-line previously formed upon the plate. It will thus be seen that accurate register slots and holes are punched in the curved plate, which can be used as locating means in subsequent plate making operations, such as backing up or trimming. As a result, all color plates of the same subject will be trimmed in the same relationship to the image on their printing surface, thus insuring proper register on the press.

As will be illustrated in Figure 10*a*, the dimensions of the apertures punched in plate 91 by the punches 128 and 130 are such that the ends of the register marks are retained and are thus available for use later in re-checking the accuracy of register.

While the invention has been described with reference to the specific structure illustrated in the drawings, it is not to be limited save as defined in the appended claims.

I claim:

1. Mechanism for registering and marking printing plates comprising a base, plate marking means on the base, a turntable on the base, means to mount a printing plate on the turntable and registering means on the base adapted to be selectively brought into operative relation with the printing plate.

2. Mechanism for registering and marking printing plates comprising a base, plate marking means on the base, a turntable on the base, means to mount a printing plate on the turntable, registering means on the base adapted to be selectively brought into operative relation with the printing plate and means to locate the turntable in either of two positions.

3. Mechanism for registering and marking printing plates comprising a base, plate marking means on the base, registering means spaced from the marking means on the base and adapted to coact with a printing surface in a position spaced from the position of the surface when marked by the marking means, and turntable means to hold a printing plate in different positions on the base to be registered and marked by the respective registering and marking means.

4. Mechanism for registering and marking printing plates comprising a base, spaced plate marking means on the base, registering means on the base spaced from the marking means, and turntable means to secure a printing plate selectively in different positions to be marked by the marking means and to be registered by the register means.

5. Mechanism for registering and marking printing plates comprising a base, spaced plate marking means on the base, a turntable on the base to position a printing plate thereon, registering means on the base spaced from the marking means and adapted to be brought into operative relation with the printing plate, and means to locate the turntable in either of two positions.

6. Mechanism for registering and marking printing plates comprising a base, spaced plate marking means on the base, a frame having a transparent ruled register screen therein, means to hinge the frame on the base to enable the frame to swing in a plane lying between the marking means, and turntable means to secure a printing plate on the base and between the marking means.

7. Mechanism for registering and marking printing plates comprising a base, spaced plate marking means on the base, a frame having a transparent ruled register screen therein, means to hinge the frame on the base to enable the frame to swing in a plane lying between the marking means, a turntable on the base to position a printing plate between the marking means, and means to locate the turntable in either of two positions.

8. Mechanism for registering and marking printing plates comprising a base, spaced plate marking means on the base, a frame having a transparent ruled register screen therein, means to hinge the frame on the base to enable the frame to swing in a plane lying between the marking means, a turntable on the base between the marking means, means to locate the turntable in either of two positions, and cooperating registering mechanism on the screen and turntable to locate the screen with respect to the turntable.

9. Mechanism for registering printing plates comprising a base, registering means mounted on the base and adapted to be selectively brought into operative relation with a printing plate, a turntable mounted on the base adapted to support the printing plate thereon selectively in different positions, a transparent sheet member, and clamp means on the turntable to secure the sheet member thereon.

References Cited in the file of this patent

UNITED STATES PATENTS

| | | |
|---|---|---|
| 565,153 | Cohen | Aug. 4, 1896 |
| 1,018,153 | Bank | Feb. 20, 1912 |
| 1,134,938 | Bader et al. | Apr. 6, 1915 |
| 1,388,968 | Ogden | Aug. 30, 1921 |
| 1,443,810 | Betts et al. | Jan. 30, 1923 |
| 1,780,677 | Huebner | Nov. 4, 1930 |
| 1,800,209 | Christopherson | Apr. 11, 1931 |
| 1,820,880 | Crehore | Aug. 25, 1931 |
| 1,839,866 | Claybourn | Jan. 5, 1932 |
| 2,011,584 | Lengel et al. | Aug. 20, 1935 |
| 2,095,542 | Claybourn | Oct. 12, 1937 |
| 2,178,264 | Meyer | Oct. 31, 1939 |
| 2,199,614 | Bungay | May 7, 1940 |
| 2,277,405 | McKiernan | Mar. 24, 1942 |
| 2,324,476 | Becker | July 20, 1943 |
| 2,353,726 | Gutmann | July 18, 1944 |
| 2,369,425 | Becker | Feb. 13, 1945 |
| 2,512,937 | Hartman | June 27, 1950 |